Sept. 25, 1962  M. A. DE BRUYNE ETAL  3,055,049
PRILLING DEVICE
Filed Aug. 5, 1960

INVENTORS:
Marinus A. de Bruyne
Bartholomeus G. M. Hoedemakers
Johan W. Hoogendonk
Raphael Vourover, attorney.

3,055,049
PRILLING DEVICE
Marinus A. de Bruyne, Bartholomeus G. M. Hoedemakers, and Johan W. Hoogendonk, Geleen, Netherlands, assignors to Stamicarbon, N.V., Heerlen, Netherlands
Filed Aug. 5, 1960, Ser. No. 47,784
Claims priority, application Netherlands Aug. 8, 1959
4 Claims. (Cl. 18—2.6)

It is known that globular fertilizer granules can be prepared by spraying a melt of, e.g. urea, ammonium nitrate, ammonium nitrate mixed with limestone or dicalcium phosphate, calcium nitrate, through small apertures provided in the wall of a reservoir rotating around a vertical axis, the so-called "prilling cup." During their fall, the sprayed drops solidify to form round granules with a smooth surface, the so-called "prills."

When carried out on a technical scale, it was found that the above process had to be frequently interrupted because the spray openings in the prilling cup became clogged. This was mostly due to the openings becoming clogged with solidified melt.

Applicants have discovered that a prilling cup can be kept operating much longer if a scraping element be provided on the inside of the perforated wall of the prilling cup so that the spray openings become clogged less quickly.

Figures 1, 2:
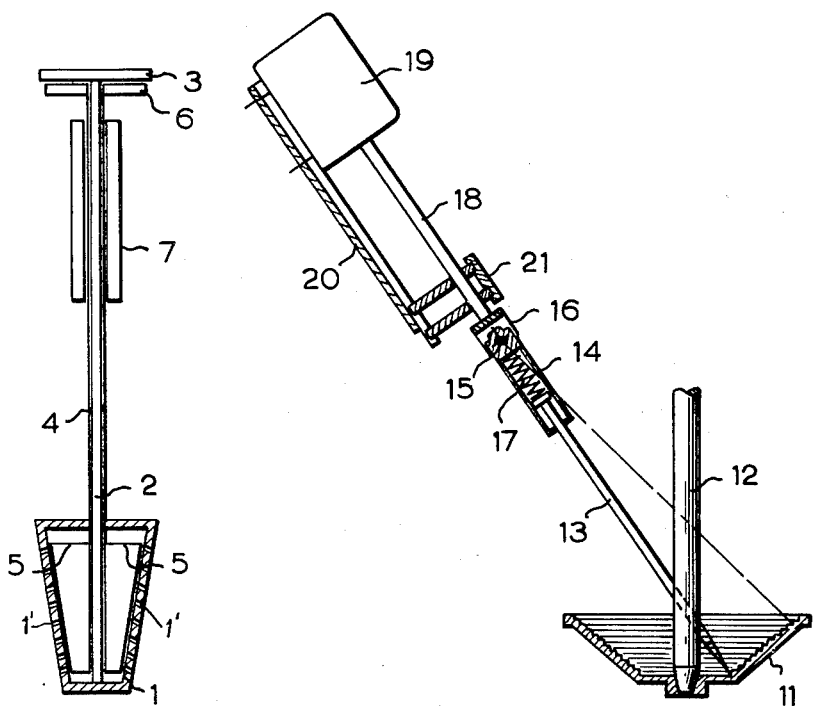
Figure 3:
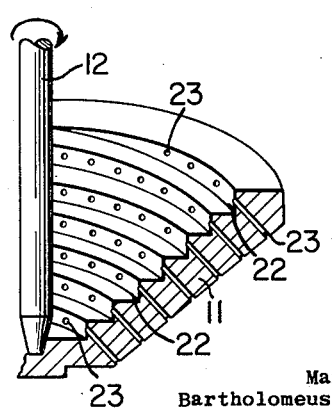

For the purpose of the present invention, different types of scraping elements can be employed. Two efficient embodiments of scraping elements are illustrated diagrammatically on the attached drawings. FIGURES 1 and 2 of this drawing represent longitudinal sections of prilling cups with their respective scraping elements. FIGURE 3 is an enlarged view of a section of the prilling cup of FIGURE 2.

Referring first to FIGURE 1:
The prilling cup consists of a conical vessel 1, having spray openings 1' therein, the vessel 1 being attached to a vertical shaft 2, the other end of which is provided with a driving pulley 3. The shaft 2 runs through a hollow shaft 4, one end of which is provided with two blade-shaped scraping elements 5, the outer edges of which contact against, or almost against, the smooth inner wall of the conical prilling cup. The other end of shaft 4 is provided with a driving pulley 6. The shaft 4 is supported in a bearing 7.

By means of the driving pulleys 3 and 6, the prilling cup 1 and the scraping elements 5 can be caused to rotate at various operating speeds.

Surprisingly, applicants found that it was not at all necessary for the blade-shaped scraping elements 5 to come into contact with the smooth inner wall of the prilling cup. The cleaning effect was already satisfactory with a distance of a few millimeters between the outer edges of the elements 5 and the wall of the prilling cup.

In addition to prilling cups with a smooth inner wall, use is made of prilling cups whose walls are first provided with a spiral groove 22 in which the spray openings 23 are then drilled. In the case of such prilling cups, the above described construction of scraping blades cannot be suitably used as a scraping device.

With such a grooved prilling cup wall, the scraper pin illustrated in FIGURE 2 was found to be quite satisfactory. In this figure, the prilling cup 11 is attached to the vertical shaft 12, which can be made to rotate by a motor (not shown in the drawing) in the direction indicated by the arrow in FIGURE 3.

A scraper pin 13 rests in the spiral groove provided in the inner wall of the prilling cup. While the prilling cup is rotating, the pin moves upwards in this groove. When the pin is in its highest position, a lifting magnet 19 provided with a suitable time relay (not shown) serves to pull the pin out of the groove, so that it resumes its lowest position. The top end of the pin 13 is housed in a holder 14, which turns on a pivot 15 provided in a fork 16. This fork 16 is attached to the end of a sliding bar 18 which is periodically raised for a short moment by the lifting magnet 19. The lifting magnet is attached to a mounting plate 20. The sliding bar 18 is guided in a guide 21.

Since the distance between the pivot 15 and the top end of the groove is somewhat greater than the distance between the pivot and the bottom end of the groove, the pin holder has been provided with a pressure spring 17 which adjusts this difference in distance so that the pin always remains in the groove.

To counteract wear of the pin in the groove, use is made of a steel pin with a hardened point.

We claim:
1. Device for spraying melts comprising in combination: a shaft; means for rotating said shaft; a vessel mounted on said shaft for rotation therewith, said vessel having an upright wall provided with spray openings, said openings disposed in a spiral groove provided inside the upright wall and scraping means inside the vessel and adjacent the upright wall, whereby the upright wall is cleaned while the vessel is rotating.

2. Device according to claim 1, wherein the scraping means is constituted of a pin in engagement with said groove.

3. Device according to claim 2, wherein the pin is pivotally mounted and is provided with spring-biasing means.

4. Device according to claim 2, comprising means for removing the scraping pin from the upper end of the spiral groove and repositioning it in the lower end of said groove.

References Cited in the file of this patent
UNITED STATES PATENTS

| | | |
|---|---|---|
| 1,352,623 | Perry | Sept. 14, 1920 |
| 2,361,709 | Roelen | Oct. 31, 1944 |